(12) United States Patent
Hiller et al.

(10) Patent No.: US 6,950,657 B1
(45) Date of Patent: Sep. 27, 2005

(54) METHOD FOR PROVIDING MULTIPLE POINTS OF CONNECTIVITY TO SUBSCRIBERS OF WIRELESS COMMUNICATION NETWORKS

(75) Inventors: Thomas Lloyd Hiller, Glen Ellyn, IL (US); Robert Jerrold Marks, Homewood, IL (US); Peter James McCann, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 190 days.

(21) Appl. No.: 09/609,907

(22) Filed: Jul. 3, 2000

(51) Int. Cl.⁷ .............................................. H04Q 7/20
(52) U.S. Cl. .................. 455/445; 455/442; 455/554.2
(58) Field of Search .................................. 455/445, 446, 455/447, 448, 449, 452, 453, 435.2, 436, 455/438, 439, 442, 443, 550.1, 552.1, 553.1

(56) References Cited

U.S. PATENT DOCUMENTS

| | | | |
|---|---|---|---|
| 5,652,751 A * | 7/1997 | Sharony ..................... | 370/227 |
| 5,673,031 A * | 9/1997 | Meier ......................... | 340/2.4 |
| 5,793,842 A * | 8/1998 | Schloemer et al. ........ | 455/33.1 |
| 5,940,771 A * | 8/1999 | Gollnick et al. ............ | 455/517 |
| 5,956,331 A * | 9/1999 | Rautiola et al. ............ | 370/338 |
| 6,044,062 A * | 3/2000 | Brownrigg et al. ........ | 455/445 |
| 6,160,804 A * | 12/2000 | Ahmed et al. .............. | 455/433 |
| 6,272,129 B1 * | 8/2001 | Dynarski et al. ........... | 370/356 |
| 6,421,714 B1 * | 7/2002 | Rai et al. .................... | 455/422 |
| 6,466,571 B1 * | 10/2002 | Dynarski et al. ........... | 370/352 |
| 6,493,328 B2 * | 12/2002 | Fong et al. .................. | 370/329 |
| 6,542,734 B1 * | 4/2003 | Abrol et al. ............. | 455/412.1 |
| 6,765,909 B1 * | 7/2004 | Sen et al. .................... | 370/392 |
| 2001/0036820 A1 * | 11/2001 | Fong et al. .................. | 455/403 |
| 2001/0036830 A1 * | 11/2001 | Wu et al. .................... | 455/436 |

FOREIGN PATENT DOCUMENTS

WO   WO 9949677   9/1999   ............ H04Q 7/22

OTHER PUBLICATIONS

Wong et al., "Soft Handoffs in CDMA Mobile Systems," IEEE Personal Communications, US. IEEE Communications Society, vol. 4, No. 6, Dec. 1, 1997, pp. 6-17.

* cited by examiner

*Primary Examiner*—Edward F. Urban
*Assistant Examiner*—Thuan Nguyen

(57) ABSTRACT

A method for allowing a mobile of a wireless communication simultaneous access to multiple data networks coupled to the wireless communication network. A network interface is created between network controlling elements, such as Base Station Controllers, of the wireless communication network. The network interface allows various communication channels established by the mobile to be routed to network controlling elements that are coupled to the various data networks. Information from various established communication channels are routed between various network controlling elements. Thus, a mobile is able to communicate simultaneously with different data networks. The network interface also allows handoffs to be executed with virtually no interruptions and no loss of information being exchanged between the mobile and system equipment involved in the handoff.

14 Claims, 2 Drawing Sheets

METHOD FOR PROVIDING MULTIPLE POINTS OF CONNECTIVITY TO SUBSCRIBERS OF WIRELESS COMMUNICATION NETWORKS

BACKGROUND OF THE INVENTION

1. Field of the Invention

The present invention provides a method for providing subscribers of a wireless communication network with multiple points of connectivity without adding additional hardware to the network or to the subscriber's mobile.

2. Description of the Related Art

Wireless communication networks have established well known techniques that provide multiple subscribers access to these networks. Some of these techniques include Code Division Multiple Access (CDMA), Time Division Multiple Access (TDMA) and Frequency Division Multiple Access (FDMA). Also, various combinations of these techniques (and other multiple access techniques) are used to provide access to subscribers. As the use and popularity of these networks have increased, the type of services and resources provided to subscribers have changed and increased in complexity. The resources are the system equipment (e.g., radio transmitters, radio receivers, processing equipment) usually owned and operated by a service provider. The resources are also various capabilities provides by the system equipment such as the bandwidth allocated to a particular subscriber, the power at which a subscriber is allowed to transmit its communication signals or the rate at which a subscriber is allowed to receive and transmit information. The services are the ability of any one subscriber to use the resources in a variety of ways. Traditionally, wireless communication networks allowed subscribers to communicate with each other and with other communication networks via voice channels; that is, the main type of communication was voice communications between subscribers or between subscribers and other networks.

However, with the advent of the Internet and other data networks, wireless communication networks have had to provide services not only for voice but also for data. The data are usually in the form of digital information that represent communication signals for text, graphics, video and other signals including voice. Various protocols have been created to accommodate the transmission and reception of data over wireless communication networks. Each protocol is a particular set of rules that dictates how communications between subscribers are to be initiated, maintained and terminated. The protocols also dictate the manner of communications between subscribers and system equipment and communications between subscribers and other networks. Communication signals originating from system equipment are used to implement the various steps of a protocol; these communication signals are typically referred to as system information or signaling information. Many of these protocols have been established into standards that are followed by communication networks throughout various parts of the world.

Referring to FIG. 1, there is shown a typical wireless communication network infrastructure which complies with standards for particular CDMA data networks called CDMA 2000 networks. A subscriber, represented by wireless laptop 148, is migrating within the network. The subscriber and/or its equipment (i.e., subscriber equipment) will hereinafter be referred to as a Mobile Node (MN). An MN is typically owned and operated by a subscriber of the communication network. An MN can be, for example, a cellular phone, a wireless laptop PC or a wireless Personal Digital Assistant (PDA). The MN typically gains access to the network via an air interface between the MN and a network attachment point. A network attachment point is the system equipment that communicates directly with an MN and facilitates access to the communication network for an MN. Access to a network involves confirming that an MN is authorized to use the resources of the communication network and allowing the MN to use available resources upon such confirmation. The air interface defines the signaling information to be exchanged between an MN and the BTS (over a communication channel between MN and BTS) and resources to be allocated to the MN to give the MN access to the network.

In FIG. 1, a network attachment point is a BTS or a set of BTS's (e.g., BTS 120, 122, 124, 126, 128, 130, 132 and 134) which contain radio transmitters and receivers (not shown) used to transmit and receive MN and system communication signals. Each BTS serves a particular cell where each cell is symbolically represented by a hexagon. For example, cell 114 is being served by BTS 134. Each cell delineates the geographical boundaries within which an MN can receive and/or transmit communication signals to a BTS. In many networks, such as the one depicted in FIG. 1, the cells are divided into sectors whereby each sector represents a particular geographical area being served by particular resources of the BTS. For ease of illustration, each cell is shown to be divided into six sectors. It will be readily understood that the number of sectors in a cell depends on the particular resources contained in the BTS serving the cell and thus a cell may be divided into more or less than six sectors.

Each BTS is coupled to a Base Station Controller (BSC) via a network communication link. A BSC can be coupled to more than one BTS; for example, BSC 138 is coupled to BTS 120, 122, 124 and 126. The BSC's are examples of network controlling elements which are system equipment that manage the network attachment points (e.g., BTS's) to which they are coupled; that is, the BSC's dictate how and when certain communication signals are to be transmitted and/or received by a BTS or a set of BTS's. Thus, a BSC services and controls the MN. For example, a BSC instructs a BTS as to the power level at which the BTS is to transmit its communication signals to the MN. Information exchanged between a BSC and a BTS is performed in accordance with a standard being followed by the communication network. The BSC's are coupled to each other via communication links (not shown). Each BSC is also coupled to a Packet Data Serving Node (PDSN) which serves as a gateway between the wireless communication network and a data network (not shown) such as the Internet; that is, the data network is coupled to the wireless communication network via the PDSN. The PDSN's serve a certain geographical area within which the cells of the corresponding BTS's are located. Referring to FIG. 1 PDSN 1 (i.e., system equipment 146) serves a certain area denoted by the dashed lines; similarly, PDSN2 and PDSN3 have their own serving areas. The PSDN is a type of data service entity, which not only serves as a gateway to a coupled data network, but also allows a subscriber of the wireless communication network to use the available services of the coupled data network.

For certain applications, a MN requires the use of a persistent IP address in the data network coupled to a PDSN. The IP address is a specific label that specifically identifies the MN regardless of which data network is exchanging information with the MN. A persistent IP address means that as the user moves geographically and connects to a new PDSN, the data network will route the user's packets while maintaining the same user address to the current PDSN even though the user is not in an area of the data network that would usually be able to route such a packet given the address of the packet. One example of a protocol that allows this service is Mobile Internet Protocol (IP) [Request For Comment 2002]. The MN invokes Mobile IP procedures by registering with the PDSN as part of initialization with the PDSN. Initialization with the PDSN is the set of procedures required for the MN to obtain service on the PDSN. Mobile IP has two styles of data network mobility (i.e., transferring from one data network location to another data network location), one in which the PDSN participates directly in the data network mobility function, and another in which the mobile itself performs data network mobility functions. There are other types of data network mobile routing protocols as well, such as General Packet Radio Service (GPRS) and Cellular Digital Packet Data (CDPD). All of these protocols will route information to a PDSN which is then able to deliver the information to the MN.

Some or all of the BSC's may also be coupled to Mobile Switching Centers (MSC) (not shown) which provide access to the Public Switched Telephone Network (PSTN). Each MSC typically manages a region comprising several BTS's. Therefore, each set of BTS is controlled by one BSC (and perhaps one MSC) which is coupled to one or more PDSN that provides access to a data network. Although FIG. 1 shows a one to one relationship of BSC's and PDSN's in many cases a service provider would have an architecture where a plurality of BSC's are connected to a plurality of PDSN's to provide load balancing or fault tolerance in the event a PDSN fails.

Information transmitted by an MN is received by multiple BTS's coupled to the same BSC. Thus the information received by each BTS is identical. Each BTS transfers its received information to the same BSC which formats the information into a block called an octet stream. The octet stream is then transferred to the PDSN coupled to the BSC and the PDSN transfers the octet stream to the coupled data network. In short, the MN is given access to the data network coupled to the multiple BTS's via the BSC and PDSN.

Wireless communication networks such as the one depicted by FIG. 1 suffer from the limitation that, for a particular MN, only one access point to a data network at a time is allowed. Due to the increased demand to gain access to data networks (as explained above), subscribers often desire simultaneous access to different networks. The networks can be private data networks, public data networks (e.g., the Internet) or voice networks such as the PSTN. Also, information being transmitted and received by an MN having access to a data network is often quite sensitive to interruptions in service caused by handoffs being performed by the wireless communication network. The interruptions are often due to loss of information that occur during handoffs. Particular types of information—such as information associated with multimedia applications—are especially sensitive to loss of information that can occur to handoffs.

A handoff is a well known procedure whereby a migrating MN being served by a particular BTS is physically located such that the BTS cannot provide adequate quality of service to the MN. The BSC controlling the serving BTS at some point will decide to transfer (i.e., "hand off") its service and associated control of the MN to another BSC in control of another set of BTS's (i.e., new set of BTS's) more adequately able to provide the services required by the migrating MN. Because this handoff is between BSC's, this handoff is often referred to as a hard handoff. Still, referring to FIG. 1, if the MN (e.g., laptop 148) moved from BTSs controlled by BSC1 (144) to the set of BTS's controlled by BSC 2 (136), a handoff is also required between the corresponding PDSN's (i.e., handoff between PDSN 1 (146) and PDSN 2 (136)). Now, if the MN desires the same persistent address on PDSN 2 as the MN had on PDSN 1, the MN must register with PDSN 2 using data network mobile routing protocol such as Mobile IP, as discussed above. A user may desire the same address so as to not disrupt current communication flows, or so that the user may be reached via a known and static address anywhere in the data network. As part of this process, the mobile must re-establish communications with PDSN 2 via negotiation as well as authenticate (confirm its authorization to use the network) itself to the network. The PDSN may contact other network equipment to complete authentication and authorization of the MN, and may invoke security protocols to protect the MN's communications. As explained above the PDSN may directly participate in the data network mobile routing protocols or may simply be an intermediary between the network and the mobile.

An MN can be handed off from one BTS to another several times during a session depending on the location and speed of the MN relative to the BTS's of the network. A session is the amount of time elapsed during which an MN has obtained access to the network, engaged in communications by using resources provided by the network and terminated the particular communications. A Selection and Distribution Unit (SDU) (not shown), which is usually part of a BSC, chooses the BTS that is to serve a migrating MN prior to handoff. The SDU typically chooses a BTS based on the transmitting power level of an MN's communication signals being received by a candidate BTS and the information rate at which the MN is conveying information. During the handoff, the controlling BSC transfers signaling information and other data associated with a handoff protocol to the new BSC so that the new BSC can control its BTS to properly serve the MN.

During such transference of data, service to the migrating MN is interrupted causing information being transmitted or received by the MN to be lost. There are two types of interruptions that cause information loss. One interruption occurs while the radio equipment in the MN reconfigures itself to receive radio signals from the new BTS. While the radio in the mobile reconfigures its radio receivers, it does not receive information. The interruption due to radio reconfiguration is relatively short and is typically on the order of a fraction of a second. The other interruption is the information loss that occurs while the MN registers and initializes with the new PDSN. As outlined above, registration and initialization with the new PDSN (e.g. PDSN 2) implies various protocol procedures such as data link initialization, authentication, authorization, and accounting, security procedures, and mobile routing in the data network. While the second PDSN (e.g. PDSN 2) performs these functions, information is routed to the previous PDSN (e.g. PDSN 1). This second interruption is much longer and is the cause of the majority of loss of information for the mobile. The amount of delay that occurs due to the execution of the data link layer initialization, Mobile IP, AAA, and security functions may be several seconds.

It should be noted that a handoff can also be initiated by a MN whereby the MN is configured to monitor the quality of signals from the network and then decide when a handoff is warranted. In such a case the MN informs the network of the need for a handoff and the network then executes the handoff as described above.

Multiple point connectivity, which is the ability of an MN to simultaneously have access to multiple networks (e.g., data networks) coupled to the wireless network via data service entities (e.g., PDSN's), would require that additional hardware and software be added to the MN. Examples of the additional hardware are transmitters, receivers, modulators and other circuitry typically used to process communication signals. Such additional resources would not only allow multiple point connectivity, but would significantly, if not virtually, eliminate interruptions (and thus loss of data) due to handoffs.

In such cases, the network would be able to hand off an MN from one BTS to another with relatively little or no loss of data. That is, an MN would have previously established a first session with a first set of BTS's being controlled by a first BSC coupled to a first PDSN. During the time that the mobile communicates with the first set of BTSs, the mobile monitors radio signals from other sets of BTSs. When the mobile or network detects that the quality of the radio signal from the first set of BTSs has degraded to a point that further degradation would cause an unsatisfactory communication quality or even loss of a session, the mobile then establishes a second and identical session with a second set of BTS's under the control of a second BSC coupled to a second PDSN. Each session is handled by a different set of hardware (e.g., radio transmitter and receiver) within the MN. After establishing data service on the second PDSN, the MN would drop the first session—and thus the first set of BTSs. Because the mobile engaged in this "make before break" handoff procedure, the mobile would experience relatively little or no loss of communication.

Currently, for CDMA networks, an MN is capable of opening multiple simultaneous instances of a Radio Link Protocol. The RLP is a protocol that dictates how a network is to provide multiple resources to a single MN where such resources are being provided by a particular set of BTS's controlled by a particular BSC. Each instance of an RLP, which is likened to a communication channel, is governed and established by data stored in an origination message sent by an MN or by a BSC of the network while establishing a session between the MN and the network. The origination message also contains information indicating the type of service to be provided by the network during the session. Thus, an MN can be transmitting and/or receiving a first type of information through one instance of RLP and transmitting and/or receiving a second type of information through another instance of RLP. Because each of the instances of RLP are routed through the same set of BTS's—and thus the same BSC and PDSN—the MN does not have simultaneous access to different networks. As stated previously, the information from the various instances of RLP are combined as an octet stream and sent to a single PDSN. The octet stream is divided into 20 ms frames which are transmitted and received by the MN and controlling BSC. The amount of information contained in a frame is dependent on the rate at which the information is being conveyed between an MN and the destination network. To achieve multiple point connectivity with the use of additional hardware and software in the MN would require the redesign and manufacture of wireless subscriber and system equipment. Such an approach would mandate substantial changes in the standards currently being used by wireless networks. Most importantly, the cost of adding new hardware to subscriber and system equipment is most likely quite prohibitive to subscribers and system providers.

What is therefore needed is a method for providing multiple points of connectivity to subscribers of wireless communication networks without having to add new hardware to subscriber and system equipment whereby such method can be implemented within the context of the communication standards which are being followed by the communication networks. In the context of the communication network depicted by FIG. 1, it would be desirable for an MN of such a network to have multiple instances of RLP simultaneously where each instance is associated with a different network controlling element (i.e., a different BSC).

SUMMARY OF THE INVENTION

The method of the present invention provides network interfaces between network controlling elements of a wireless communication network whereby the network interfaces allow information to be simultaneously exchanged between an MN and multiple data service entities of the communication network thus providing multiple point connectivity. Typically, a network controlling element is coupled to a data service entity of the network and is also coupled to a network attachment point. The network controlling elements are also coupled to other network controlling elements via system communication links governed by the network interfaces. The network interfaces define how information is to be exchanged between network controlling elements. In particular, the network interfaces define the signaling information to be exchanged between network controlling elements and how information (subscriber and/or system information) is to be routed between network controlling elements. The network interfaces are such that they are compatible with standards being used by the wireless communication network. The network interfaces therefore become part of and are integrated into the standard being followed by the wireless communication network.

The network interface of the method of the present invention is established either by an MN, a network controlling element or a data service entity. Establishment by an MN is initiated by an MN first gaining access to the communication network through a network attachment point in accordance with the standard being followed by the communication network. The host network controlling element (i.e., the network controlling element coupled to the accessed network attachment point) allocates multiple communication channels to the MN. In obtaining access to the communication network, the MN sends an origination message or other message defined by the standard to the network attachment point. The message is received by the network attachment point and is transferred to the host network controlling element. The message, once received by the host network controlling element, establishes the network interface of the method of the present invention; that is, the message contains data on the number of communication channels to be allocated to the MN, uniquely identifies each such communication channel, associates each such channel with the MN and also identifies the particular network controlling element(s) to which the information in a particular communication channel is to be routed. Accordingly, the host network controlling element routes information associated with particular communication channels to the proper network controlling elements.

Thus, information being exchanged between the MN and various data service entities is routed from the accessed network attachment point through the host network controlling element and through the established network interface to other network controlling elements. The network controlling elements (including the host) then route their received information to their corresponding data service entities.

The network interface of the method of the present invention can be established by system equipment. In such a case, a data service entity establishes the network interface by sending a message (e.g., an origination message) to its network controlling element to establish a network interface. A network controlling element can also establish a network interface by generating data that route communication channels associated with a particular MN to other network controlling elements. After the network interface is established, information received by the network controlling element from the data network (via the data service entity) is routed as per the dictates of the established network interface. Therefore, the network interface of the method of the present invention allows an MN to have simultaneous connections to different data service entities of a communication network and thus provides multiple point connectivity to different networks.

In a preferred embodiment of the method of the present invention, the network interfaces allow an MN having simultaneous access to different network attachment points controlled by different network controlling elements to be handed off from one network attachment point to another network attachment point with relatively little or no loss of data being exchanged between the MN and the corresponding data service entities. The MN first gains access to the wireless network through a first network attachment point coupled to a first data service entity via a first network controlling element.

In obtaining access to the communication network, the MN establishes a set of communication channels (in accordance with a standard) through which information is exchanged between the MN and the first data service entity via the first network controlling element. When the quality of service being provided to the MN is such that a handoff is warranted, the MN (or the first network controlling element or the first data service entity) initiates a handoff with a second network controlling element. The first network controlling element will establish a network interface allowing it to route information associated with the MN to the second network controlling element. The MN will establish a first set of communication channels between it and the second network attachment point and will also establish a network interface at the second network controlling element. The second network controlling element will transport information received to and from the MN to the first network controlling element. The first network controlling element will transport information to and from the first data service entity (via the network interface) to the second network controlling element. Thus, the MN maintains communication with the first data service entity, even though it is communicating through communication channels via the second network attachment point and the second network controlling element. The MN will now establish a second set of communication channels (in accordance with a standard) with the second network attachment point associated with the second network controlling element. The second network controlling element will connect the second set of channels to a second data service entity to which is coupled to the second network controlling element. The second network controlling element will connect the MN's informationon these second set of channels coupled to the second data service entity. The MN will commence registration and initialization procedures with the second data service entity. These registration procedures will result in the data network routing the MN's information to the second data service entity. One example of these procedures initialization and registration is the Mobile IP protocol.

While the MN is establishing the second set of communication channels with the second data service entity via the second network attachment point and the second network controlling element as per the handoff procedure, information being exchanged between the MN and the first data service entity is routed from the first network controlling element to the second network controlling element (or vice versa) in accordance with the dictates of network interface of the method of the present invention. Thus, prior to the completion of the handoff, the MN is able to exchange information with the first and second data service entities. Upon completion of the registration and initialization procedures with the second data service entity, the MN terminates the first set of communication channels between itself and the second network controlling element. The second network controlling element then releases the connection to the first network controlling element. Exchange of information between the MN and the second data service entity is now achieved via the second network controlling element. The handoff is thus executed with relatively little or no loss of data.

DETAILED DESCRIPTION

The present invention provides network interfaces between network controlling elements of a communication network so as to allow information being conveyed through multiple channels between an MN and a network attachment point to be routed to multiple network controlling elements and thus multiple data service entities of the communication network. The data service entities are typically coupled to other communication networks and thus the network interfaces enable multiple point connectivity between and MN and various other communication networks. The network interface of the method of the present invention is based on and is compatible with communication protocols and standards that govern how information is exchanged between network controlling elements of the communication network. For example, for some Asynchronous Transfer Mode (ATM) networks, the network interface of the method of the present invention would be based on and is compatible with the Q.2931 signaling control protocol. Another example of the applicability of the network interface is the Genetic Routing Encapsulation (GRE) of packets of information governed by A10 and A11 interfaces developed by the Inter-Operability Specification (IOS) for CDMA2000 access network version 4. Yet another example in which the network interface can be applied is the Internet Protocol (IP) that follows the signaling protocol and the format specified in the Simple Computer Telephony Protocol (SCTP).

The network interface of the method of the present invention is not dependent on any communication protocol or type of communication network. Furthermore, the network interface of the method of the present invention is not dependent on any particular network architecture. The network interface is able to identify each of the multiple communication channels established between the MN and the attachment point and associate each such channel to a particular network controlling element and data service entity. The network interface allows a network controlling element to route a particular established communication channel to its proper data service entity. Therefore, the MN is able to obtain simultaneous access to multiple networks.

Figure 2:
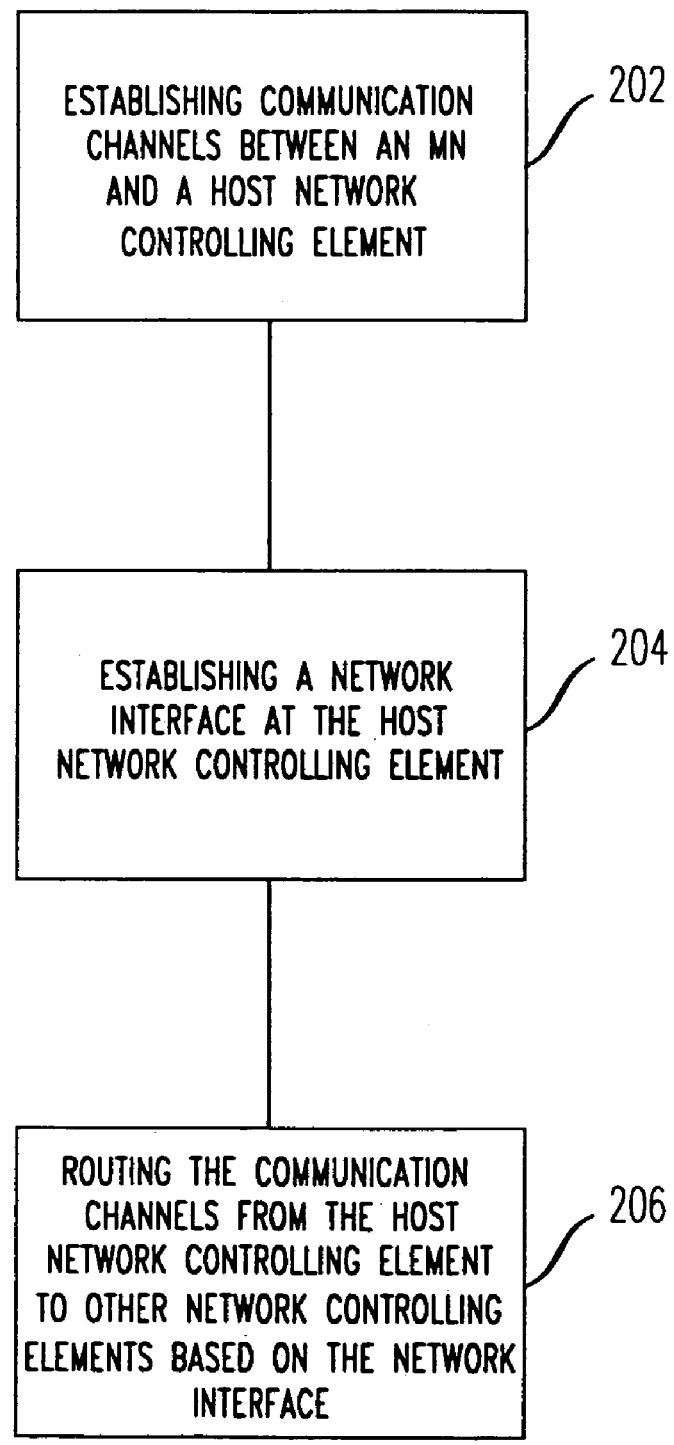
FIG. 2 shows the method of the present invention.

Referring now to FIG. 2, the method of the present invention is shown. In step 202 communication channels are established between an MN and a host network controlling element. The host network controlling element is the network controlling element coupled to the network attachment point accessed by the MN. First, the MN gains access to the communication network by exchanging signaling information with a network attachment point in accordance with a standard being followed by the network. The standard also dictates how the MN establishes multiple communication channels through which information is to be exchanged between the MN and the host network controlling element via the network attachment point. Establishment of a communication channel involves the allocation of resources that allow communication signals associated with a particular MN to be transmitted and received. Accessing a communication channel involves the actual usage of the allocated resources to exchange information between an MN and a network controlling element via a network attachment point. In accordance with a standard being followed by the communication network, the network attachment point then transfers the signaling information received from an MN to the host network controlling element coupled to the network attachment point.

In step 204 the network interface of the method of the present invention is established at the host network controlling element. Part of the information received by the host network controlling element from the network attachment point is system information (e.g., an origination message) that establishes the network interface of the method of the present invention. In establishing the network interface of the method of the present invention, the system information identifies the communication channels established by the MN; thus, each such channel is associated with the MN. Also, the system information associates each such particular channel with at least one particular network controlling element and dictates that each such channel be routed to the corresponding data service entity or entities.

In step 206, the host network controlling element routes information from each of the established communication channels to the proper network controlling element which is coupled to a communication network (e.g., a data network) via a data service entity. The routing of communication channels is performed based on the received signaling information. Depending the origin of the signaling information, the routing of the communication channels can be caused by the network controlling element or an MN or a data service entity. It should be well understood that the routing of information (system and/or subscriber information) being conveyed through the communication channels is also referred to as routing of communication channels. The information is routed between network controlling elements via system communication links (not shown). Therefore, the MN is able to simultaneously have access to multiple communication networks. It should be noted that the system information which establishes the network interface can originate from the MN or from another network controlling element. In other words, the network interface is established by either system equipment (e.g., network controlling element, data service entity) or subscriber equipment or both.

The multiple point connectivity capability provided by the network interface of the method of the present invention can be used to perform handoffs with relatively little or no loss of data. The network interface of the present invention allows an MN having simultaneous access to different network attachment points controlled by different network controlling elements (coupled to different data service entities) to be handed off from one network attachment point to another network attachment point with virtually no loss of data being exchanged between the MN and the corresponding data service entities. The MN first gains access to the wireless network through a first network attachment point coupled to a first network controlling element.

In obtaining access to the communication network, the MN establishes a set of communication channels (in accordance with a standard) through which information is exchanged between the MN and a first data entity via a first attachment point and a first network controlling element. The first attachment point is coupled to a first network controlling element which is a host network controlling element. When the quality of service being provided to the MN is such that a handoff is warranted, the MN (or the first network controlling element) initiates a handoff with a second network attachment point and a second network controlling element. The handoff can also be initiated by the first network controlling element or the data service entity coupled to the first network controlling element.

The handoff is initiated in accordance with a standard being followed by the wireless communication network. As part of the handoff procedure, the MN is instructed by the first network controlling element to access a second network controlling element via a second network attachment point. The second network controlling element is coupled to a second data service entity. In gaining access to the second network controlling element via a second network attachment point, the MN establishes a first set of communication channels between it and the second network controlling element via the second network attachment point. The first network controlling element also establishes a network interface—as per the method of the present invention—at its location and at the second network controlling element. It should be noted that the network interface can also be established by the second network controlling element or the second data service entity. The second network controlling element is thus a host network controlling element.

The MN now establishes a second set of communication channels between it and the second data service entity via the second network attachment point and the second network controlling element. While the MN is establishing this second set of communication channels, information is still being exchanged between the MN and the first data entity through the first set of communication channels via the second network attachment point, the second network controlling element and the first network controlling element. In other words, the network interface (at the second network controlling element) allows the first set of communication channels to be routed from the second network controlling element to the first network controlling element and ultimately to the first data service entity while the second set of communication channels is being established; this allows information being exchanged between the MN and the first data service entity to be routed from the second network controlling element to the first network controlling element or vice versa. The second set of communication channels is being established to allow information to be exchanged between the MN and the second data service entity via the second network attachment point and the second network controlling element.

When the second set of communication channels between the MN and the second data service entity has been established, and the MN has initialized and registered as necessary with the second data service entity, the MN terminates the first set of communication channels. The second network controlling element no longer routes the first set of communication channels to the first data service entity via the first network controlling element. The first set of communication channels are removed and information associated with the MN is no longer routed between the first and the second network controlling points. The MN now communicates with the second data service entity via the second set of communication channels which extend from the MN to the second network attachment point to the second network controlling element. The handoff is performed as a "make before break" procedure meaning that information being exchanged between the MN and a first data service entity is terminated only after new communication channels have been established between the MN and a second data service entity. The handoff is thus executed with relatively little or no loss of data.

Figure 1:
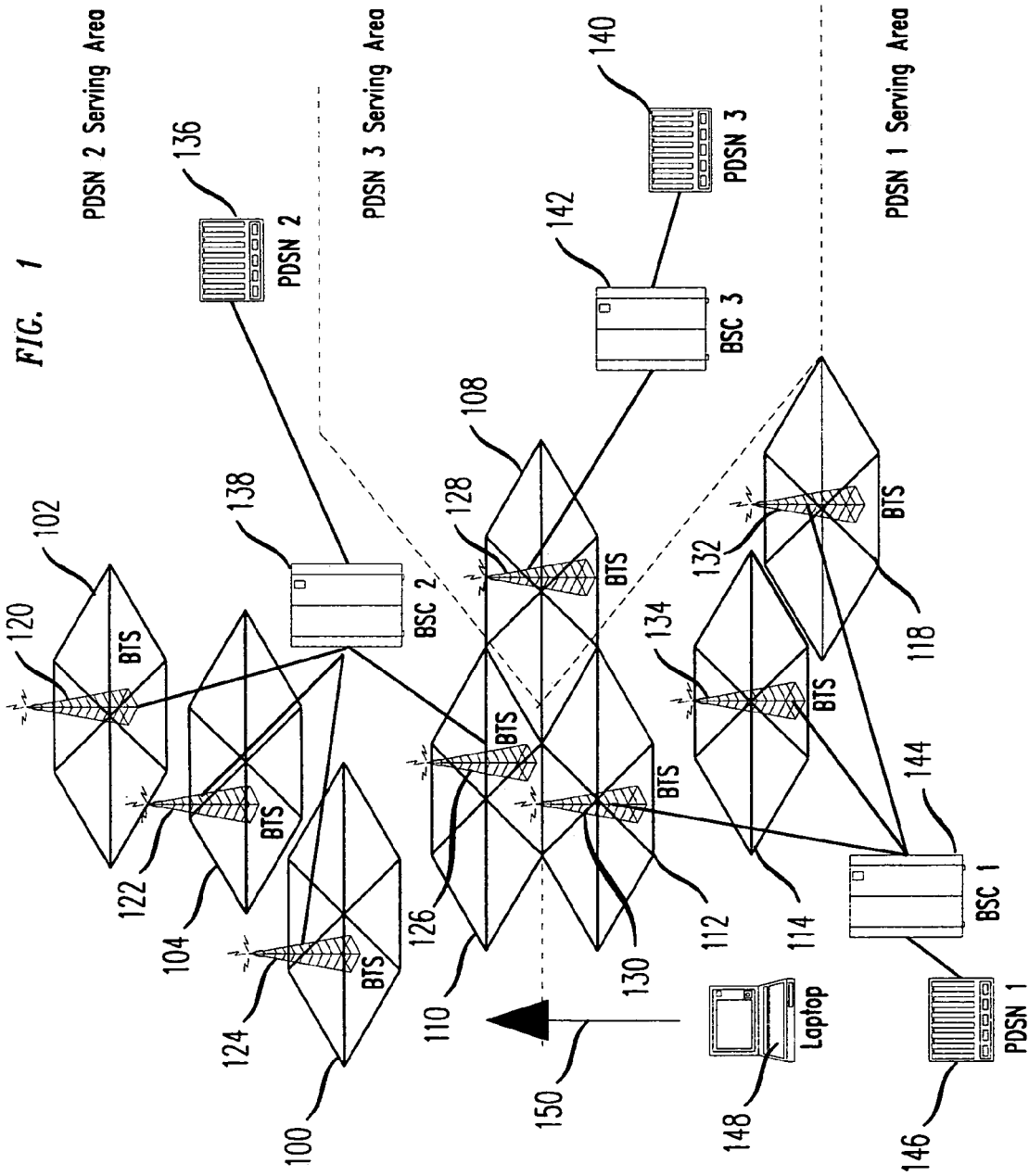
FIG. 1 depicts the architecture of a typical wireless communication network.

For ease of explanation only, the network interface of the present invention is applied to a handoff application for the communication network depicted in FIG. 1. The network attachment points are the set of BTS's or at least one of the BTS's being served by a network controlling element. The network controlling elements are the BSC's. The data service entities are the PDSN's. Laptop 148 represents an MN. Laptop 148 is shown as an MN migrating from an area served by BSC1 (element 144) and thus BTS 132 and 134. The direction of migration is shown by arrow 150. Laptop 148 gains access to the communication network in accordance with the standard being followed by the network and also establishes multiple instances of RLP (i.e., multiple communication channels). Specifically, laptop 148 exchanges information with BTS 130, 134 and 132 all of which are coupled to BSC1 (element 144); BSC1 receives the information from BTS 130, 132 and 134 and also allocates the proper resources to laptop 148 in accordance with the standard being followed. The information received by BSC 1 is formatted into an octet stream and transferred to PDSN1 (element 146) in the form of 20 ms frames. The mobile initializes and registers with PDSN 1. Packets from the data network for the mobile are routed to PDSN 1. PDSN 1 transfers the information to a first network (not shown) coupled to PDSN1 and with which laptop 148 is communicating. This first network can be, for example, a data network.

As laptop 148 migrates away from BSC1 and towards BSC2 (element 138), the quality of the communication signals may be such that adequate communication between laptop 148 and the BTS's associated with BSC1, i.e., BTS 130, 132 and 134, is no longer possible, or at best, very difficult. The quality of communications is often defined by the system provider and typically is directly related to the power level of the communication signals being received by an MN such as laptop 148. BSC1 detects the change in quality of the signals and initiates a handoff between it and BSC2; that is, BSC1 wishes to hand off MN to BSC2 and allow MN to exchange information with PDSN2. It should be noted that the handoff can also be initiated by laptop 148 or by PDSN1. In accordance with the standard, BSC1 instructs laptop 148 to contact BSC2 by sending the appropriate messages to BTS 126 which is coupled to BSC2. BTS 126 receives the messages from laptop 148 and transfers them to BSC2.

A network interface is established at BSC1 and BSC2; that is the establishment of a network interface involves identifying certain instances of RLP and dictating as to where (i.e., which BSC) these identified instances of RLP are to be routed. Laptop 148 transmits an origination message for one of the instances of RLP already established whereby the origination message identifies the instance of RLP and dictates that the instance be routed to the second data network. Information associated with the identified instance is routed from BSC1 to BSC2 and on to PDSN1. Laptop 148 now communicates with PDSN1 through the first set of instances of RLP which are routed from BSC2 to BSC1 and onto PDSN1. Therefore, laptop 148 is able to have access to and communicate with PDSN 1.

Laptop 148 now establishes a second set of instances of RLP with BSC2. These RLP instances are established with a request for a connection to the PDSN coupled to BSC 2, namely PDSN 2. After BSC 2 connects laptop 148 to PDSN 2, laptop 148 initializes itself with PDSN 2 by initializing a data link layer such as PPP, and performing Mobile IP registration. PDSN 2 will authenticate, authorize the mobile, using other entities in the data network. PDSN 2 may also establish security through the data network to protect the mobile's communications. PDSN 2 will perform Mobile IP registration procedures in accordance with Mobile IP standards. That is, the PDSN may be directly involved in Mobile IP registrations, or may simply pass the Mobile IP registrations along transparently to other entities in the data network.

Laptop 148 now communicates with PDSN1 through the first set of instances of RLP which are routed from BSC2 to BSC1 and onto PDSN1 and uses the second set of instances of RLP for communication with PDSN2. The first and second set of instances of RLP use BTS 126 which is coupled to BSC2. When the second set of instances of RLP are established and the registration and initialization procedures with PDSN 2 handoff are completed, the first set of instances are removed and information associated with laptop 148 is no longer routed from BSC1 to BSC2. Laptop 148 now exchanges information with PDSN2 via the second set of instances of RLP implemented with BTS 126 and BSC2. In this manner, there is relatively little or no loss of information in using this "make before break" approach to handoffs.

We claim:

1. In a communications system comprising at least two wireless service areas, ones of said service areas including a network controlling element having an interface to a respective data network gateway, wherein a communication path is maintained between network controlling elements in respective pairs of said wireless service areas, a method for providing connectivity for a Mobile Node (MN) with at least two of said respective data network gateways as the MN moves from a first service area to a second service area, the method comprising the steps of:

establishing plural communications channels via a common RF link between the MN and the network controlling element at the second service area, a first of the plural channels being arranged for connection to the data network gateway interface for that second service area and a second of the plural channels being arranged for connection, via the communication path maintained between the first service area and the second service area, to the data network gateway interface for the first service area.

2. The method of claim 1 wherein the step of establishing plural communications channels is implemented in a network interface, and the network interface associates each established communication channel with the MN and dictates to which service area network controlling element each of the communication channels is to be routed.

3. The method of claim 1 wherein the step of establishing plural communications channels further comprises:
   establishing a multiple of communication channels between the service area network controlling element and an MN in accordance with a standard being followed by the communication network;
   generating signaling information that associates each established channel to the MN and the service area network controlling element; and
   routing the established communication channels from the service area network controlling element to the another service area based on the signaling information.

4. The method of claim 1 wherein multiple data serving nodes are simultaneously accessed by routing communication channels from the service area network controlling element to a network controlling element coupled to a corresponding data serving node in the another service area.

5. The method of claim 2 where the network interface is established by an MN.

6. The method of claim 2 where the network interface is established by a network controlling element.

7. The method of claim 2 where the network interface is established by a data serving node.

8. The method of claim 1 wherein ones of the service area network controlling elements are interfaced to a data network via corresponding ones of a plurality of data serving nodes (PDSN) and comprising the additional step of:
   performing a handoff between the service area network controlling element, and a network controlling element interfaced to a data network gateway at the another service area, whereby, during the handoff, communication channels established and accessed at the network controlling element of the another service area are routed from that network controlling element to the service area network controlling element.

9. The method of claim 8 where, upon completion of the handoff, the communication channels routed between the service area network controlling element and the network controlling element of the another service area are removed and the MN communicates with the service area network controlling element via communication channels established and accessed during the handoff.

10. The method of claim 8 where the handoff is performed in accordance with a standard being followed by the wireless communication network.

11. The method of claim 8 where the handoff is initiated by the service area network controlling element.

12. The method of claim 8 where the handoff is initiated by the MN.

13. The method of claim 8 where the handoff is initiated by a data serving node coupled to the service area network controlling element.

14. In a communications system comprising at least two wireless service areas, ones of said service areas including a network controlling element having an interface to a respective data network gateway, wherein a communication path is maintained between network controlling elements in respective pairs of said wireless service areas,
   a network interface provided at a serving network controlling element and operating to establish plural communications channels via a common RF link between a served Mobile Node and the serving network controlling element, a first of the plural channels being arranged for connection to the data network gateway interface for that serving network node and a second of the plural channels being arranged for connection, via the communication path maintained between the serving network controlling element and a network controlling element at another service area, to the data network gateway interface for the another service area.

* * * * *